_(12)_ United States Patent
Sekertzis et al.

(10) Patent No.: US 8,907,537 B2
(45) Date of Patent: Dec. 9, 2014

(54) ELECTRICAL MACHINE WITH PROTECTIVE CAP

(75) Inventors: Vassilios Sekertzis, Stuttgart (DE); Lars Rudolph, Stuttgart (DE); Klaus Herbold, Asperg (DE); Gerlinde Weber, Schwieberdingen (DE); Daniel Amaral, Campinas-SP (BR)

(73) Assignee: Robert Bosch GmbH, Stuttgart (DE)

( * ) Notice: Subject to any disclaimer, the term of this patent is extended or adjusted under 35 U.S.C. 154(b) by 361 days.

(21) Appl. No.: 13/140,571

(22) PCT Filed: Nov. 17, 2009

(86) PCT No.: PCT/EP2009/065299
§ 371 (c)(1),
(2), (4) Date: Aug. 5, 2011

(87) PCT Pub. No.: WO2010/069693
PCT Pub. Date: Jun. 24, 2010

(65) Prior Publication Data
US 2011/0285230 A1 Nov. 24, 2011

(30) Foreign Application Priority Data

Dec. 19, 2008 (DE) .......................... 10 2008 054 959

(51) Int. Cl.
*H02K 5/22* (2006.01)
*H02K 5/04* (2006.01)
*H02K 5/08* (2006.01)

(52) U.S. Cl.
CPC ....................................... *H02K 5/04* (2013.01)
USPC .............................................. 310/89; 310/91

(58) Field of Classification Search
CPC ............. H02K 5/22; H02K 5/10; H02K 5/04; H02K 5/08; H02K 5/14; H02K 5/15; H02K 5/16
USPC .................. 310/89, 85, 88, 91; 174/562, 563; 411/45–48
IPC .................... H02K 5/10, 5/04, 5/08, 5/14, 5/15, H02K 5/16
See application file for complete search history.

(56) References Cited

U.S. PATENT DOCUMENTS 5,315,195 A * 5/1994 Bradfield et al. ................ 310/89
5,881,989 A * 3/1999 O'Brien et al. .................. 411/45

(Continued)

FOREIGN PATENT DOCUMENTS

| CN | 2515888 | 10/2002 |
|---|---|---|
| DE | 218504 | 2/1985 |

(Continued)

OTHER PUBLICATIONS

PCT/EP2009/065299 International Search Report.

*Primary Examiner* — Michael Andrews
(74) *Attorney, Agent, or Firm* — Michael Best & Friedrich LLP

(57) ABSTRACT

The invention relates to an electrical machine, particularly an alternating current generator, that can be designed as a three-phase alternator, for example, having—preferably electrical—components that are protected from access, wherein to this end there is a protective cap (47) fastened by means of at least one snap region (103), wherein the snap region (103) has a snap-in hook (92) having a snap-in hook root (106), wherein there is a bending region (109) between the snap-in hook (92) and the snap-in hook root (106), wherein the bending region (109) has a cambered surface (112, 115).

15 Claims, 4 Drawing Sheets

(56) References Cited

U.S. PATENT DOCUMENTS

| | | |
|---|---|---|
| 6,133,666 A | 10/2000 | Hollenbeck et al. |
| 6,987,336 B2 | 1/2006 | Streng et al. |
| 7,345,391 B2 * | 3/2008 | Bradfield et al. ............... 310/89 |
| 2001/0054853 A1 * | 12/2001 | Hayashi et al. ................. 310/89 |
| 2005/0068135 A1 * | 3/2005 | Nishino et al. ................ 335/207 |
| 2006/0018116 A1 | 1/2006 | Plunk et al. |

FOREIGN PATENT DOCUMENTS

| | | | |
|---|---|---|---|
| DE | 19912755 | 9/1999 | |
| DE | 19813039 | 10/1999 | |
| DE | 19945788 | 3/2001 | |
| EP | 1551092 | 7/2005 | |
| GB | 1297329 | 11/1972 | |
| GB | 1297329 A * | 11/1972 | ............... H02K 5/08 |

* cited by examiner

ELECTRICAL MACHINE WITH PROTECTIVE CAP

BACKGROUND OF THE INVENTION

European patent application EP 155 1092 A2 discloses a polyphase generator having a protective cap which on the one hand is attached to a circuit board by means of screws and on the other hand can be attached by means of snap-action hooks to a regulator housing.

Furthermore, a generator type, which is known as a so-called LIC generator, is known from the same applicant. This generator is marketed throughout the world and has a protective cap which is attached to a rectifier by means of snap-action hooks and a plurality of screws.

In contrast to this, the object is to make the snap-action hooks even more robust and less flexible than has been the case in the past.

SUMMARY OF THE INVENTION

The aim of the proposed solution is to considerably increase the force for bending the snap-action hook, and thus to improve the holding security.

For this purpose, the bending area of the snap-action hook has a curved surface. This curved surface results in a multi-axis stress state being produced during bending, which in the end results in particularly high resistance against the bending area being bent open and bent out of place. According to a further refinement of the invention, the curved surface is in the form of a groove, that is to say preferably hollow-cylindrical and possibly in the form of an angle. Configurations of the surface such as this result in a relatively minor notch effect and therefore a high holding capability for the bending area. Furthermore, the surface is curved on the side on which a surface, which engages behind, of the snap-action hook is located. This has the advantage that, during non-uniform cooling-down processes which are virtually never avoidable (the protective cap is injection-molded at a high temperature), the snap-action hook is not aligned such that it deflects away from the point that it must engage behind. This therefore results in higher operational reliability.

According to a further refinement of the invention, the curved surface extends over an arc length between 60 and 150°.

A particularly space-saving configuration of the snap-action hook and mating piece on which the snap-action hook is held is obtained by the snap-action hook engaging behind a mating piece which has a cylinder-like shape.

If the mating piece has a bolt holder, which preferably has an internal thread, then on the one hand this additionally allows a compact, space-saving means of attachment by means of a securing bolt which, for example, may be in the form of a screw.

The invention provides that the protective cap rests on the bolt holder and is held between a bolt head and a mating piece. This allows a compact way of attachment overall. If a contact surface of the protective cap is in the form of a ring segment, then this makes it possible to achieve a low-cost configuration by means of inserts of simple design in a mold for injection molding. The contact surface is in this case the surface on which the contact surface of a threaded bolt or a bolt head rests on the protective cap.

According to a further refinement of the invention, the surface of the snap-action hook which engages behind and the contact surface in total extend over at most 360 angular degrees. This avoids complicated injection-molding apparatuses (complicated undercuts which can only be achieved by means of extremely expensive lateral slides), and on the other hand allows a simple configuration of a mold for injection molding in this area by means of inserts whose basic shape is cylindrical.

BRIEF DESCRIPTION OF THE DRAWINGS

The invention will be explained in more detail in the following text with reference, by way of example, to the figures, in which:

FIG. 4b shows a section according to a marking in FIG. 4a,

DETAILED DESCRIPTION

Figure 1:
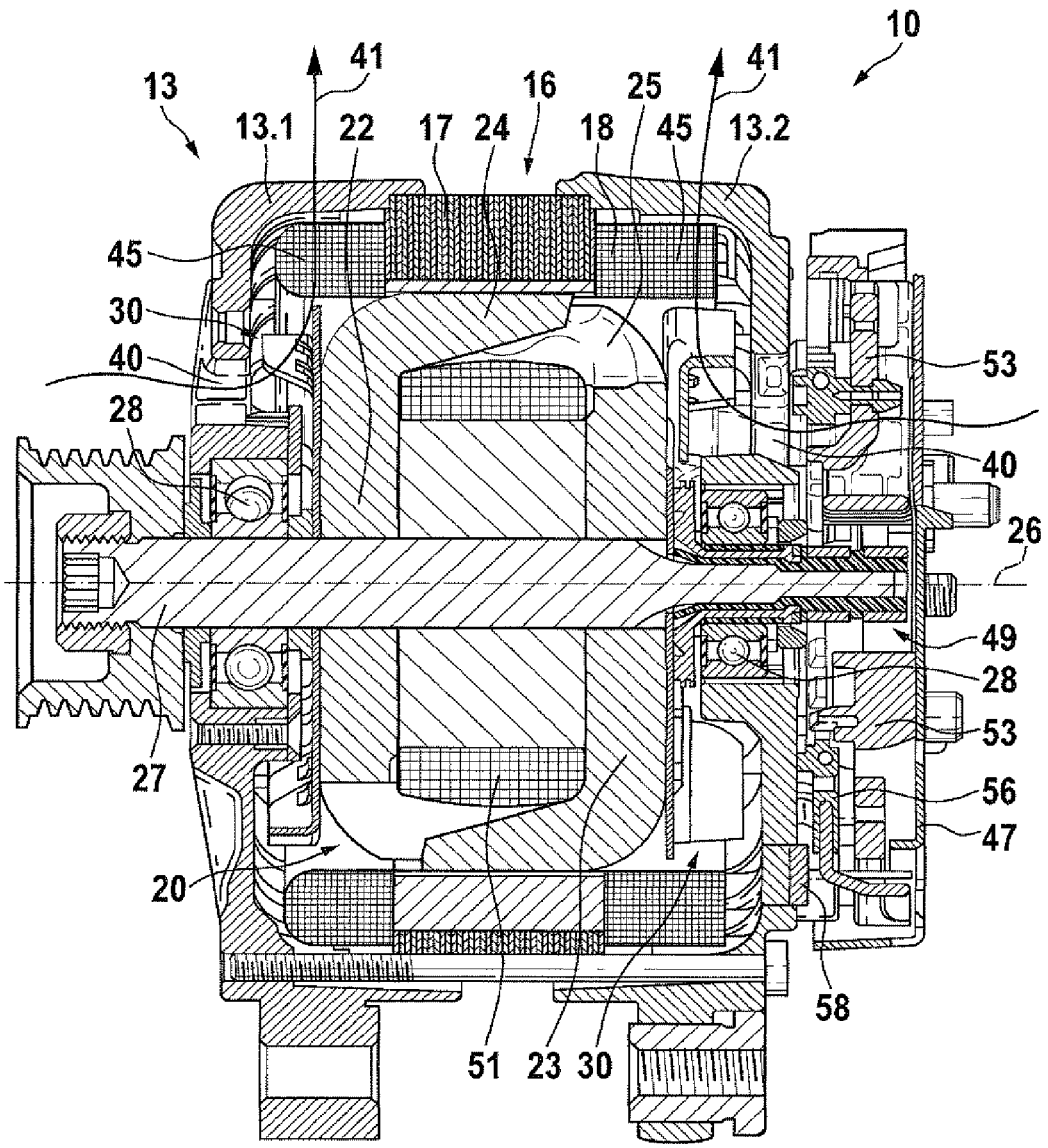
FIG. 1 shows a longitudinal section through an electrical machine.

FIG. 1 shows a cross section through an electrical machine 10, in this case in the form of a generator or an alternating current generator, in particular a polyphase generator, for motor vehicles. This electrical machine 10 has, inter alia, a two-part housing 13, which consists of a first end shield 13.1 and a second end shield 13.2. A so-called stator 16 is held in the end shield 13.1 and the end shield 13.2 and consists on the one hand of a stator iron core 17 which is essentially in the form of a circular ring and in whose slots, which are directed radially inward and extend axially, a stator winding 18 is inserted. The slotted surface, which is directed radially inward, of this annular stator 16 surrounds a rotor 20, which is in the form of a claw-pole rotor. The rotor 20 consists, inter alia, of two claw-pole boards 22 and 23, on each of whose outer circumferences claw-pole fingers 24 and 25 are arranged which extend in the axial direction. The two claw-pole boards 22 and 23 are arranged in the rotor 20 such that their claw-pole fingers 24 and 25, which extend in the axial direction, alternate with one another on the circumference of the rotor 20. This therefore results in magnetically required intermediate spaces between the claw-pole fingers 24 and 25, which are magnetized in opposite senses, and these intermediate spaces are referred to as claw-pole intermediate spaces. The rotor 20 is borne such that it can rotate by means of a shaft 27 and a respective roller bearing 28, which is located on each side of the rotor, in the respective end shields 13.1 and 13.2.

Overall, the rotor 20 has two axial end surfaces, to each of which a fan 30 is attached. This fan 30 consists essentially of a section which is in the form of a plate or disk and from which fan blades originate, in a known manner. These fans 30 are used to allow air to be exchanged via openings 40 in the end shields 13.1 and 13.2 between the outside of the electrical machine 10 and the interior of the electrical machine 10. For this purpose, the openings 40 are provided essentially at the axial ends of the end shields 13.1 and 13.2 and are used to suck cooling air into the interior of the electrical machine 10 by means of the fans 30. This cooling air is accelerated radially outward by the rotation of the fans 30 such that they can pass through the winding overhang 45, through which cooling air can pass. This effect cools the winding overhang 45. After passing through the winding overhang 45 and after flowing around this winding overhang 45, the cooling air adopts a radially outward path, through openings which are not illustrated here in this FIG. 1.

In FIG. 1, there is a protective cap 47 on the right-hand side, which protects various components against environmental influences. By way of example, this protective cap 47 covers a so-called slipring assembly 49, which is used to supply a field current to a field winding 51. A heat sink 53 is arranged around this slipring assembly 49, and in this case acts as a positive heat sink. The end shield 13.2 acts as the so-called negative heat sink. A connecting plate 56 is arranged between the end shield 13.2 and the heat sink 53 and is used to connect negative diodes 58, which are arranged in the end shield 13.2, and positive diodes, which are not shown in this illustration here, in the heat sink 53 to one another, thus providing a bridge circuit, as is known per se.

Figure 2:
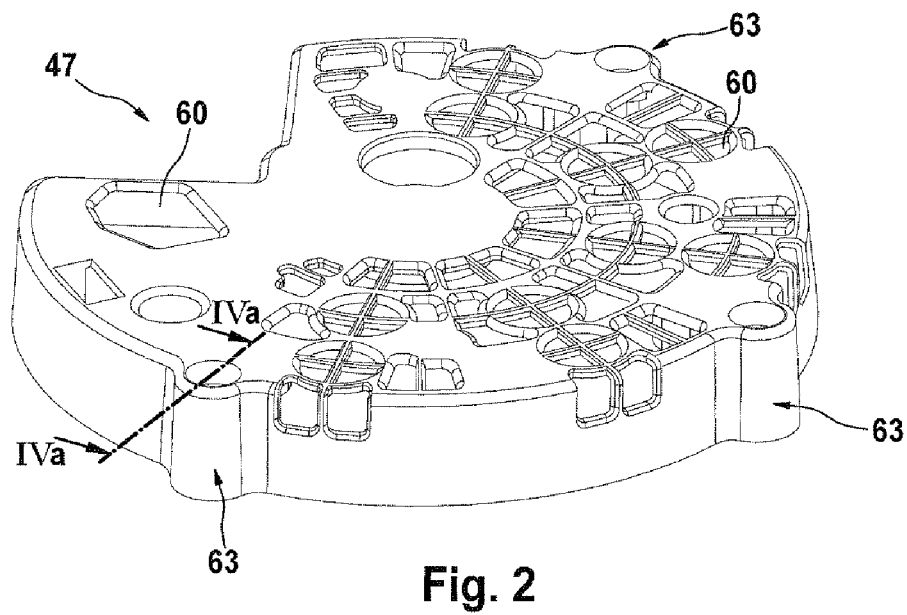
FIG. 2 shows a three-dimensional view of a protective cap.

FIG. 2 shows a three-dimensional view of the protective cap 47. By way of example, this protective cap has various openings 60 which are used, for example, for cooling of diodes or a regulator, which is not illustrated here. In this case, three attachment points 63 are provided on the outer circumference of this protective cap and comprise not only a snap-action hook but also the capability to attach the protective cap 47 to the electrical machine 10 by means of a bolt element. These attachment points 63 can be seen externally first of all by the surface which is directed outward having a shape essentially in the form of a cylindrical casing. These three attachment points 63 are arranged separated essentially by 90° from one another.

Figure 3:
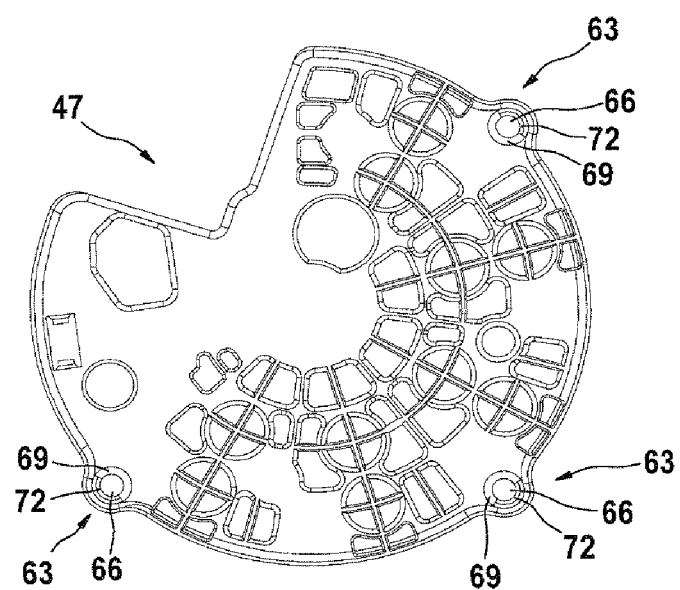
FIG. 3 shows a plan view of the protective cap shown in FIG. 2.

FIG. 3 shows a plan view of the protective cap 47. A plan view of the attachment points 63 can also be seen well here. These attachment points, in this case in an axial view, that is to say in the view which is oriented in the rotation direction of the rotor 20 with respect to FIG. 1, indicates three aperture points 66, through which bolt elements can be passed. These bolt elements, preferably provided with the bolt head, would come to rest with this bolt head on a contact surface 69. This contact surface 69 is used to hold and to clamp the protective cap 47 by means of the bolt elements. This view also shows an engaging surface 72, or a surface 72 for engaging behind, which will be described in even more detail later. This surface 72 for engaging behind is also in the form of a ring segment or circular ring segment, in the same way as the contact surface 69. The intention is for the contact surface 69 and the surface 72 for engaging behind to extend in total over at most 360 angular degrees.

Figure 4A:
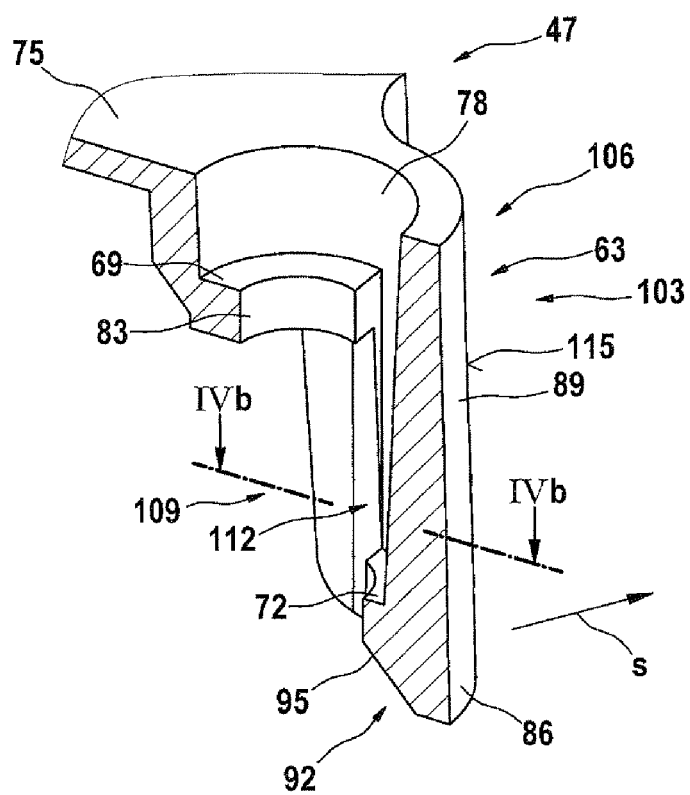
FIG. 4a shows a section according to a marking in FIG. 2.
Figure 5:
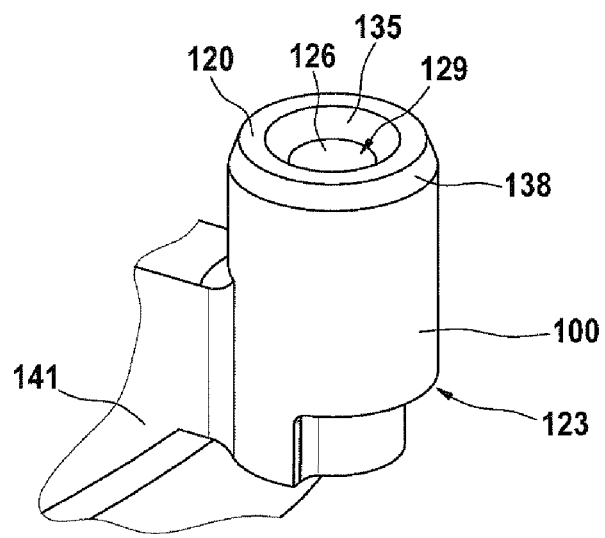
FIG. 5 shows a three-dimensional view of the bolt holder with the mating piece.

FIG. 4a shows a cross section through the attachment point 63. This attachment point 63 is shown only on the protective cap side here. The contact surface 69 can be seen well in this FIG. 4a and in this case represents the base or contact for a bolt head 80, as is shown by way of example in FIG. 6. Furthermore, the surface 72, which is already known from FIG. 3, for engaging behind is also illustrated and can be seen. In this case, the protective cap 47 has a small area of its axial end surface, starting from which an essentially cylindrical recess is first of all arranged axially inward, that is to say in the direction of the electrical machine 10. The base thereof is formed by the contact surface 69. This contact surface 69 is once again a surface of a projection 83 which is in the form of part of a ring. A snap-action hook 92 is located at the lower end, and therefore at the lower end 86 of the protective cap edge, somewhat further in the actual direction and therefore also somewhat further away from the axial end surface 75, the surface 72 thereof for engaging behind at the edge has already been described. This snap-action hook 92 has a joint incline 95 which is used to allow the protective cap 47 to be pushed over a mating piece 100 (FIG. 5). In FIG. 4a, an arrow which is annotated with the lower-case letter s indicates the direction in which the snap-action hook 92 must be moved in order to join the protective cap 47 to the mating piece 100. The snap-action hook 92 is the end of an area of the protective cap 47 which is referred to overall as the snap-action area 103. First of all, this snap-action area 103 consists of the snap-action hook 92 and the area before this snap-action hook 92 emerges. Here, this area is referred to as the snap-action hook root 106. With respect to the snap-action hook 92, this snap-action hook root 106 is that area of the snap-action area 103 which widens to a particularly minor extent, that is to say virtually not at all, in the direction s. In this case, this snap-action hook root 106 is located approximately at the same height as the projection 83, which is in the form of part of a ring. A bending area 109 is located between this snap-action hook root 106 and the snap-action hook 92. As can be seen from FIG. 4a, the bending area 109 is configured such that it has a curved surface 112. While the curved surface 112 is on the side of the bending area 109 on which the surface 72 for engaging behind is arranged, the bending area 109 also has a curved surface 115 on its outside. This outside is the surface which is arranged on that side of the bending area 109 which is facing away from the surface 72 for engaging behind. The curved surface 115 could also be defined such that it is arranged on that side of the bending area 109 which faces the snap-action direction s.

Figure 4B:
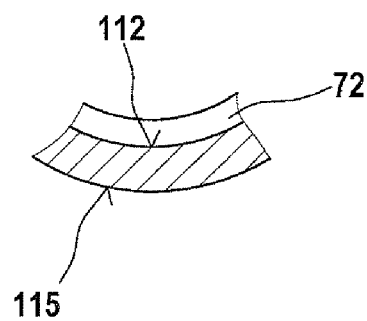

An electrical machine 10, in particular an alternating current generator, which may, for example, be in the form of a polyphase generator, is therefore known, having preferably electrical components, such as a bridge circuit comprising positive and negative diodes (rectifier) for example, which are protected against access, with a protective cap 47 being used for this purpose, which is attached by means of at least one snap-action area 103, with the snap-action area 103 having a snap-action hook 92 with a snap-action hook root 106, and with a bending area 109 which has a curved surface 112 or 115 being provided between the snap-action hook 92 and the snap-action hook root 106. This can already be seen in FIG. 4a, and is shown in more detail in FIG. 4b: the curved surface 112 is in the form of a groove and in this example is preferably also designed to be hollow-cylindrical. In contrast, the curved surface 115 is "barrel-shaped" or cylindrical (externally cylindrical). As an alternative embodiment, the surface 112 and the surface 115 could also be angled. As can also be seen from FIG. 4b, the bending area 109 is curved on that side on which a surface 72 for engaging behind of the snap-action hook 92 is located.

The invention provides that the curved surfaces 112 has an arc length between 60° and 150°.

Figure 6:
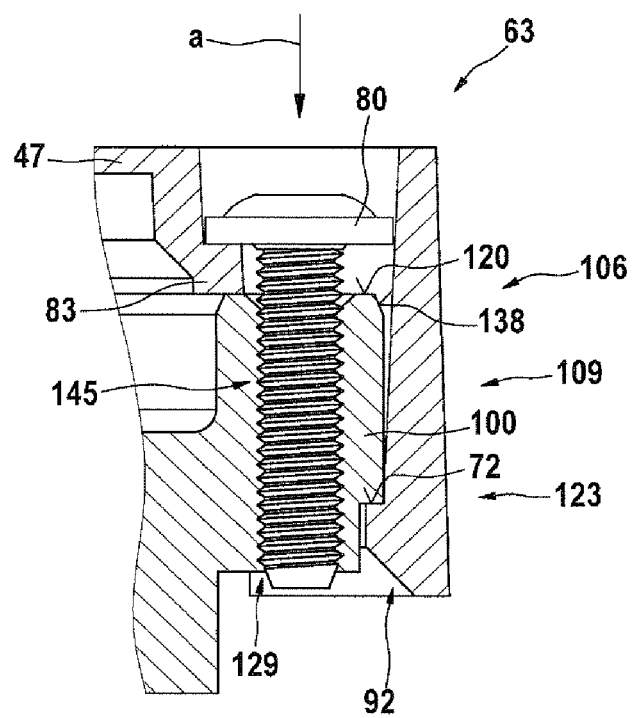
FIG. 6 shows a partial section through the bolt holder and the protective cap with a bolt.

FIG. 5 shows a mating piece 100. In this case, this mating piece 100 has an annular contact surface 120 on which the projection 83, which is in the form of part of a ring, comes to rest in the fitted state, see also FIG. 6. At least over a part of its body, this mating piece 100 has a cylindrical shape. The mating piece 100 has a projection 123 which is used for the snap-action hook 92 to engage behind, see also FIG. 6. The mating piece 100 has a central hole or a central opening 126, which runs essentially cylindrically. The central opening 126 furthermore has a thread 129. In order to make it easier to insert a bolt element 132, the central opening 126 has an insertion incline 135 at its upper end facing the projection 83 which is in the form of part of a ring. In contrast, the mating piece 100 has an incline 138 on its external circumference. As is also shown in FIG. 6, this incline 138 is used to make it easier to fit the protective cap 47 in the area of the snap-action hook 92. The invention also provides for the mating piece 100 to be part of a so-called circuit board 141. A circuit board is used to provide the bridge circuit between the positive and negative diodes. As a consequence, this circuit board 141 normally also has various conductors embedded in it, that is to say in its plastic, which are used to produce the bridge circuit. The projection 123 also runs approximately over an arc with a length of about 180° (see in the direction of the axis of the electrical machine).

FIG. 6 shows a section view through the attachment point 63. This clearly shows on the one hand the axis direction a, in which a bolt element 145 is inserted into the mating piece 100, to be precise its central opening 126. The snap-action hook 92 engages behind the projection 123, with its surface 72 for engaging behind. The projection 83, which is in the form of part of a ring, rests on the contact surface 120, and a bolt head 80 prevents it from becoming detached from this contact surface 120. The bolt head 80 presses the projection 83, which is in the form of part of a ring, against the contact surface 120. A profile of the curved surface 112 or 115 is oriented around the axis direction a, and the profile of the curved surface is oriented in the axis direction a. When no bolt element 145 is used, it is also possible to state that the profile of the curved surface 112 or 115 is oriented in the direction in which the protective cap is fitted. The profile is accordingly oriented in the fitting direction.

As can be seen from the figures, the snap-action hook 92 engages behind a mating piece 100 which has a cylinder-like shape. As can also be seen, the mating piece 100 has a bolt holder in the form of a central opening 126, which preferably has a thread 129 (internal thread). The protective cap 47 rests on the mating piece (bolt holder, contact surface 120), and is held between the bolt head 80 and the mating piece 100.

In general, it can also be stated that the shape of the protective cap is essentially circular. It has an approximately sector-like cutout on the outer circumference (FIG. 3, top left), and is attached to the circuit board 142 of the rectifier. The protective cap 47 has a plurality of attachment points 63, and is attached to the circuit board 141 via at least three of these attachment points 63. The number of attachments 63 between the protective cap 47 and the circuit board 141, that is to say in this case the number of mating pieces 100, match. The attachment points 63 lie on the periphery of the protective cap 47, and therefore at the edge of the protective cap 47. This also applies to the circuit board 141, whose mating piece 100 is likewise attached to its external circumference. The attachment points 63 of the protective cap 47 are in the form of part of a snap-action connection, as a result of which the protective cap 47 is attached via snap-action hooks 92 to the circuit board 141 of the rectifier. This snap-action connection is provided with at least one snap-action hook 92. A plurality of snap-action hooks could also be attached to each attachment point 63. The protective cap 47 need not necessarily additionally be attached by means of a bolt element 45. As is clear, the protective cap 47 is held on the mating piece 100 even without a bolt element 145, simply by means of the snap-action connection. Without screws, the attachment is lighter, and the material consumption is at the same time reduced. This also reduces the weight of the generator, or of the electrical machine. The protective cap 47 can be fitted very quickly to the circuit board 141, or to the mating piece 100 or the mating pieces 100.

What is claimed is:

1. An electrical machine having a component protected against access with a protective cap (47), the protective cap (47) being attached by means of at least one snap-action area (103), the snap-action area (103) having a snap-action hook (92) with a snap-action hook root (106), and a bending area (109) between the snap-action hook (92) and the snap-action hook root (106), the bending area (109) having a curved surface (112, 115), characterized in that the protective cap (47) covers a bridge circuit and a circuit board, and characterized in that the circuit board includes a mating piece (100) and the snap-action hook (92) engages behind the mating piece (100), and characterized in that the protective cap (47) includes a first snap-action area (103) having an outer perimeter defined by a first radius, a second snap-action area (103) having an outer perimeter defined by a second radius, and wherein the protective cap (47) further includes an outer perimeter extending between the two snap-action areas (103) defined by a third radius, the third radius being larger than both the first and the second radius.

2. The electrical machine as claimed in claim 1, characterized in that the curved surface (112) is in the form of a groove.

3. The electrical machine as claimed in claim 2, characterized in that the bending area (109) is curved on a side on which an engaging surface (72) of the snap-action hook (92) is located.

4. The electrical machine as claimed in claim 2, characterized in that the curved surface (112) is in the form of a hollow-cylindrical groove.

5. The electrical machine as claimed in claim 1, characterized in that the curved surface (112, 115) has an arc length between 60° and 150°.

6. The electrical machine as claimed in claim 1, characterized in that mating piece (100) has a cylinder-like shape.

7. The electrical machine as claimed in claim 6, characterized in that the protective cap (47) rests on the mating piece (100) and is held between a bolt head (80) and the mating piece (100).

8. The electrical machine as claimed in claim 1, characterized in that the mating piece (100) has a contact surface (120) and a central opening (126), wherein a partial annular projection (83) of the protective cap (47) rests on the contact surface (120) on an axial side of the mating piece (100), and wherein an engaging surface (72) of the snap-action hook (92) engages behind the mating piece (100) on a projection (123) of the mating piece (100).

9. The electrical machine as claimed in claim 8, characterized in that the central opening (126) includes a thread (129).

10. The electrical machine as claimed in claim 1, characterized in that a contact surface (69) of the protective cap (47) is in the form of a ring segment.

11. The electrical machine as claimed in claim 10, characterized in that an engaging surface (72) of the snap-action hook (92) and the contact surface (69) in total extend over at most 360 angular degrees.

12. The electrical machine as claimed in claim 1, characterized in that the electrical machine is an alternating current generator.

13. The electrical machine as claimed in claim 12, characterized in that the alternating current generator is a polyphase generator.

14. The electrical machine as claimed in claim 1, characterized in that the component protected by the protective cap (47) is an electrical component.

15. The electrical machine as claimed in claim 1, characterized in that the bridge circuit includes positive and negative diodes and the circuit board connects the positive and negative diodes.

* * * * *